US011455408B2

(12) United States Patent
Konita

(10) Patent No.: US 11,455,408 B2
(45) Date of Patent: Sep. 27, 2022

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Naoya Konita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 106 days.

(21) Appl. No.: 16/808,517

(22) Filed: Mar. 4, 2020

(65) Prior Publication Data
US 2021/0081552 A1 Mar. 18, 2021

(30) Foreign Application Priority Data
Sep. 18, 2019 (JP) .............................. JP2019-169585

(51) Int. Cl.
*H04L 29/06* (2006.01)
*G06F 21/62* (2013.01)
*G06F 21/31* (2013.01)

(52) U.S. Cl.
CPC .............. *G06F 21/62* (2013.01); *G06F 21/31* (2013.01)

(58) Field of Classification Search
CPC ................................. G06F 21/62; G06F 21/31
See application file for complete search history.

(56) References Cited

U.S. PATENT DOCUMENTS

| 10,182,059 | B2 | 1/2019 | Kishida | |
|---|---|---|---|---|
| 10,346,378 | B1 * | 7/2019 | Jones | ................... G06F 16/2228 |
| 2005/0209950 | A1 * | 9/2005 | Clark | ...................... G06Q 40/04 705/37 |
| 2016/0044122 | A1 * | 2/2016 | Sandholm | ............... H04W 4/06 709/206 |
| 2017/0272445 | A1 * | 9/2017 | Kishida | ................. G06F 3/1238 |
| 2020/0252402 | A1 * | 8/2020 | Momchilov | ......... G06F 9/45558 |

FOREIGN PATENT DOCUMENTS

JP 2017-167716 A 9/2017

* cited by examiner

*Primary Examiner* — Jason K Gee
(74) *Attorney, Agent, or Firm* — Oliff PLC

(57) ABSTRACT

An information processing device is shared by multiple organizations having different information protection policies, the information processing device including: a specifying unit that specifies an organization to which a user using the information processing device belongs, before identifying the user; and an application unit that applies an information protection policy corresponding to the organization specified by the specifying unit, to the information processing device.

10 Claims, 14 Drawing Sheets

FIG. 3

| 305 | 310 | 315 |
|---|---|---|
| USER ID | NAME | ORGANIZATION ID |
|  |  |  |

| 405 | 410 |
|---|---|
| ORGANIZATION ID | POLICY |
|  |  |

400

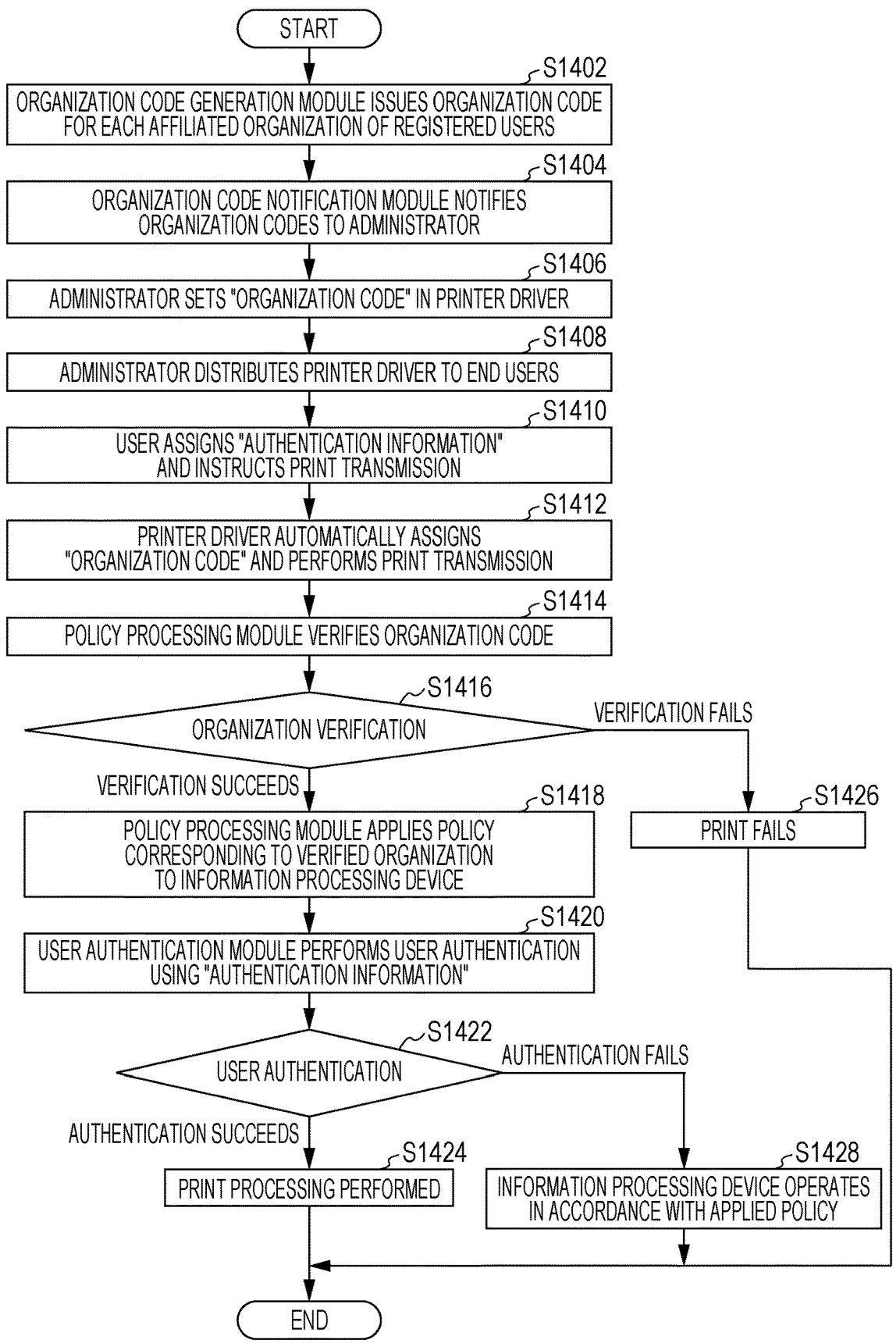

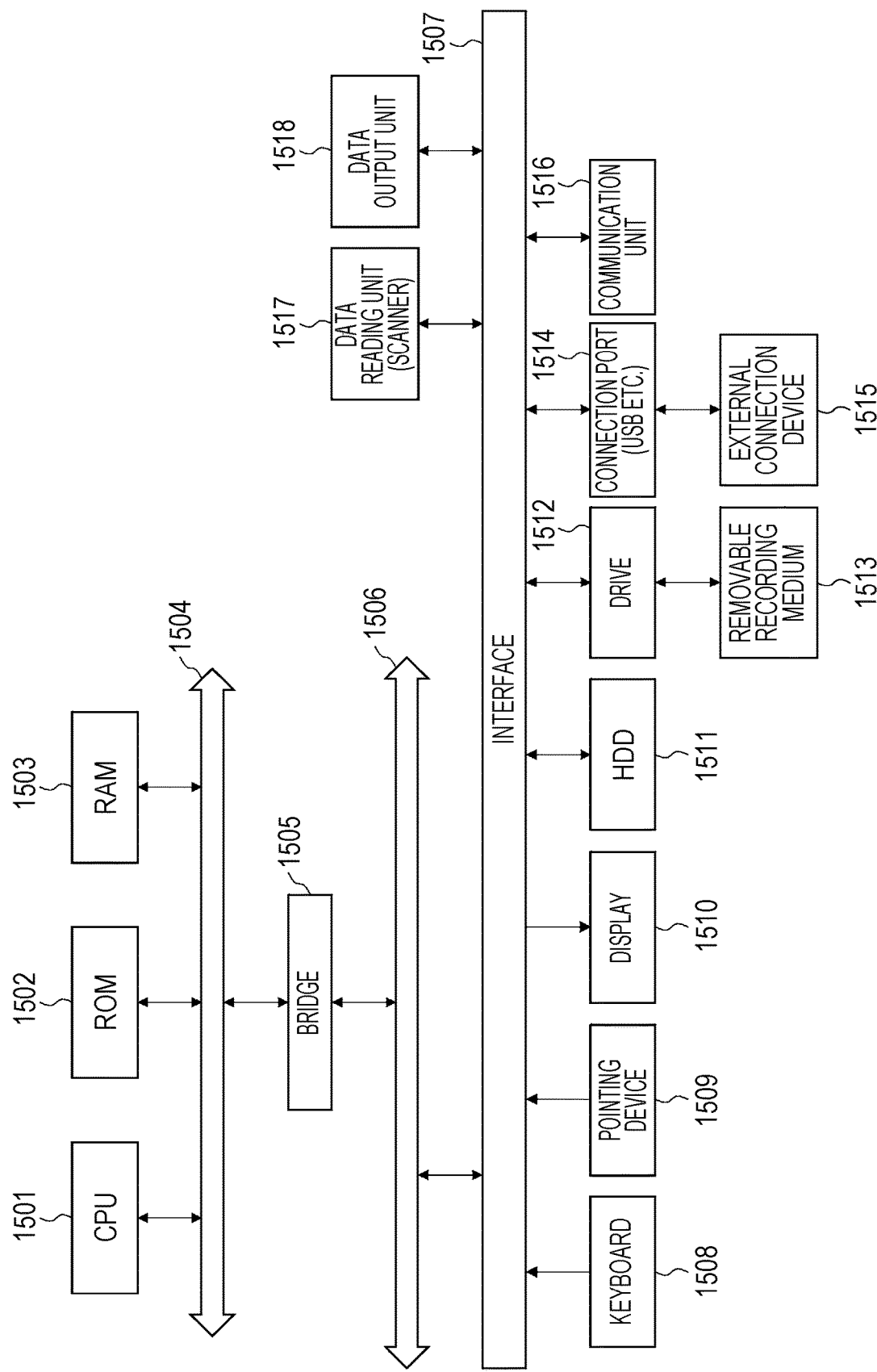

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-169585 filed Sep. 18, 2019.

BACKGROUND

(i) Technical Field

The present disclosure relates to an information processing device and a non-transitory computer readable medium

(ii) Related Art

Japanese Unexamined Patent Application Publication No. 2017-167716 addresses the problem of raking it possible to assign more detailed usage rights taking into consideration the relationship between a guest and an organization compared to the case were users who are not registered in a system within an organization are simply assigned usage rights in a uniform manner as guests, and discloses that devices provided at sites within an organization are managed by a device management system for each site, persons belonging to a site are registered as users in the device management system for that site but persons who are members of the organization yet belong to different sites are not registered in that device management system, information such as the email addresses of all members of that organization are retained in a directory service, a guest inputs an email address into a device to log in, the device management system queries the directory service as to whether that email address belongs to a member of the organization, if so, an organization internal usage right is assigned to the user, and if not, an organization external usage right is assigned to the user.

Summary

In a case were multiple organizations having different information protection policies share an information processing device, it has not been possible to apply the information protection policy of the organization to which a user belongs, in a state where the user cannot be identified. Thus, aspects of non-limiting embodiments of the present disclosure relate to providing an information processing device and a non-transitory computer readable medium that make it possible for, in a case were multiple organizations having different information protection policies share an information processing device, to apply the information protection policy of the organization to which a user belongs, in a state where the user cannot be identified.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device that is shared by multiple organizations having different information protection policies, the information processing device including: a specifying unit that specifies an organization to which a user using the information processing device belongs, before identifying the user; and an application unit that applies an information protection policy corresponding to the organization specified by the specifying unit, to the information processing device.

BRIEF DESCRIPTION OF THE DRAWINGS

Exemplary embodiments of the present disclosure will be described in detail based on the following figures, wherein:

FIG. 3 is an explanatory diagram depicting an example data structure of a user/organization management table;

FIG. 4 is an explanatory diagram depicting an example data structure of an organization/policy management table;

FIG. 14 is a flowchart depicting a processing example according to the fifth exemplary embodiment; and FIG. 15 is a block diagram depicting an example hardware configuration of a computer realizing the present exemplary embodiment.

DETAILED DESCRIPTION

Hereinafter, examples of various exemplary embodiments for realizing the present disclosure will be described on the basis of the drawings.

<<First Exemplary Embodiment>>

Figure 1:
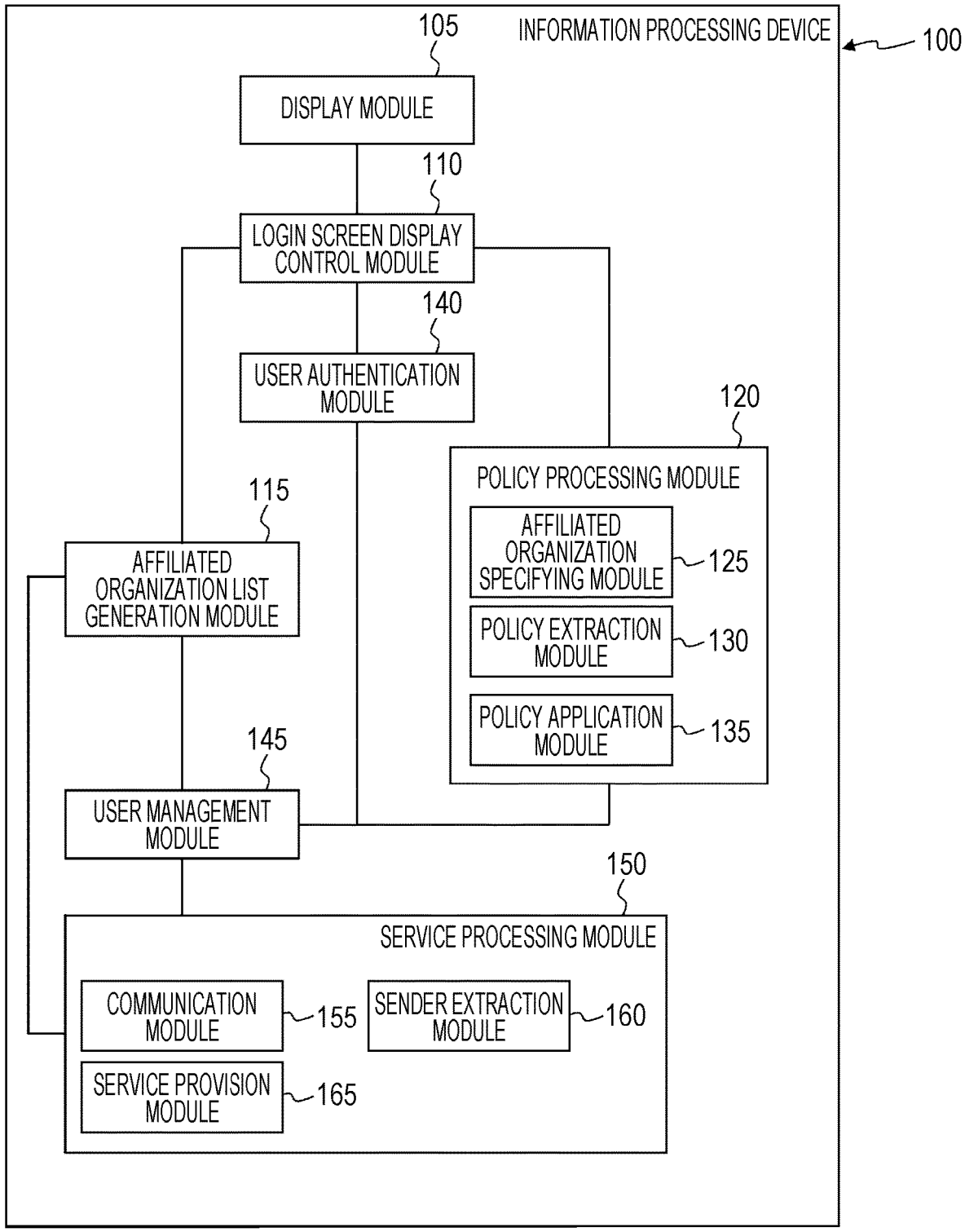
FIG. 1 is a conceptual module configuration diagram for an example configuration of a first exemplary embodiment.

FIG. 1 depicts a conceptual module configuration diagram for an example configuration of a first exemplary embodiment.

It should be noted that a module generally refers to a component such as software (including a computer program as an interpretation of "software") and hardware that can be logically separated. Consequently, a module in the present exemplary embodiment refers not only to a module in a computer program but also to a module in a hardware configuration. Therefore, the present exemplary embodiment also includes descriptions of a computer program a system and a method for causing a computer to function as the modules (examples of the computer program include a program for causing a computer to execute the respective procedures, a program for causing a computer to function as the respective units, and a program for causing a computer to realize the respective functions). However, "store", "stored", and wording similar thereto are used for the convenience of the description, but in the case were an exemplary embodiment is a computer program such wording means that something is stored in a storage device or that control is performed such that something is stored in a storage device. Furthermore, modules may correspond to functions on a one-to-one basis, but in practice, one module may be configured of one program multiple modules may be configured of one program and conversely one module may be configured of multiple program. Furthermore, multiple modules may be executed by one computer, or one module may be executed by multiple computers in a distributed or parallel environment. It should be noted that other modules may be included in one module. Furthermore, hereinafter, "connection" is used not only for physical connections but also for logical connections (for example, data transfers, instructions, reference relationships between data, logins, and the like). "Predetermined" refers to being determined prior to processing to be carried out, and is used including the meaning of being determined not only before but even after the start of processing according to the present exemplary embodiment, and, as long as it is prior to the processing to be carried out, in accordance with the situation/state at that time or in accordance with the situation/state up to that point. In a case were there are multiple "predetermined values", they may be respectively different values, or two or more values may be the sane ("two or more values" needless to say also includes all of the values). Furthermore, the wording "in the case of A, perform B" is used with the meaning "determine whether or not something is A, and in a case were A is determined, perform B". However, this excludes the case were it is not necessary to determine whether something is A. Furthermore, the case were items are listed similar to "A, B, C" or the like, the list is an example unless otherwise specified, and includes the case were only one of the item is selected (for example, only A).

Furthermore, a system or a device includes the case wen configured with multiple computers, hardware components, devices, or the like being connected by a communication system such as a network (a "network" includes a one-to-one compatible communication connection), and also includes the case wen realized using one computer, hardware component, device, or the like. "System" and "device" are used as mutuality synonymous terms. Needless to say, "system" does not include systems that are merely social "schemes" (namely social systems) constituting artificial arrangements.

Furthermore, for each item of processing performed by each module, or in a case were multiple items of processing are performed within a module, for each item of processing therefor, target information is read from a storage device, processing therefor is carried out, and thereafter a processing result is written to the storage device. Consequently, there are cases were descriptions are omitted regarding reading from the storage device before processing and writing to the storage device after processing. It should be noted that a storage device here may include a hard disk drive, a RAM (abbreviation of random access memory), an external storage medium a storage device connected via a communication line, a register within a CPU (abbreviation of central processing unit), or the like.

An information processing device 100 constituting the present exemplary embodiment has a function of providing a service to a user, and has a display module 105, a login screen display control module 110, an affiliated organization list generation module 115, a policy processing module 120, a user authentication module 140, a user management module 145, and a service processing module 150, as depicted in the example in FIG. 1.

The information processing device 100 is shared by multiple organizations having different information protection policies. That is, the information processing device 100 is used by users belonging to different organizations. There is a possibility of those organizations having different information protection policies. Thus, each user has to use the information processing device 100 in accordance with the information protection policy of the organization to which he or she belongs.

An "information protection policy" here indicates standards for information security measures regarding information assets in an organization, and includes wat is generally also referred to as a "security policy". Examples of information protection policies determined by the organizations include authentication schemes, communication schemes, conditions for whether or not monitoring logs are required and the like with respect to the information processing device 100. If the information processing device 100 does not satisfy such conditions, persons belonging to the organization in question are not able to use the services of the information processing device 100.

Furthermore, "the information processing device 100 being shared by multiple organizations having different information protection policies" refers to a state were, for example, there is a possibility of the information processing device 100 being used by multiple users, and the information protection policy determined by the organization to which a first user belongs and the information protection policy determined by the organization to which a second user belongs are different. It should be noted that it becomes possible for the information processing device 100 to be used after a user has been identified. Examples of a method for identifying a user include authentication and the like. There are cases were it is necessary to operate the information processing device 100 before a user is identified. For example, in a case were the user is to be authenticated, an operation for inputting information for authentication or the like corresponds hereto. Wen the information for authentication is input, as an information protection policy, there are cases were it is determined that the input characters are to be displayed as they are on a display device, the input characters are to be concealed, nothing at all is to be displayed, and so forth. In such cases, it is necessary for the information protection policy to be applied before the user is identified.

The display module 105 is connected to the login screen display control module 110. The display module 105 performs display in accordance with control implemented by the login screen display control module 110. For example, a login operation screen is displayed in order to receive the provision of a service by the information processing device 100, according to control implemented by the login screen display control module 110. The display module 105 is a display device such as a liquid crystal display or an organic EL display, for example, and may receive user operations as well as displaying information, as a touchscreen or the like.

The login screen display control module 110 is connected to the display module 105, the affiliated organization list generation module 115, the policy processing module 120, and the user authentication module 140. The login screen display control module 110 controls the display module 105 to display a login operation screen for users. For example, a list of organizations to which users belong generated by the affiliated organization list generation module 115, and also a login operation screen for users are displayed on the display module 105. Furthermore, user operations may be received. Examples of such operations include an operation to select the organization to which the user himself or herself belongs from out of the aforementioned list of organizations, a login operation, and the like.

Furthermore, the login screen display control module 110 may display the list of organizations to the user in such a way that the organizations sharing the information processing device 100 are displayed in a selectable manner, and the organization of the user who transmitted information to the information processing device 100 most recently is displayed at the top. For example, in a case were the information processing device 100 has a printer function, document information to be printed corresponds to information that is transmitted to the information processing device 100. Specifically, as depicted in the example in FIG. 2, in a case were a user 260 issues a print instruction using a user terminal 250 and then the user 260 causes that printing to be carried out by an image processing device 200, the organization to which that user 260 belongs ay be displayed at the top of the list.

It should be noted that in a case were multiple organizations are to be displayed, other than the aforementioned approach, the organizations may be displayed in descending order of the number of users belonging thereto, may be displayed in descending order of the cumulative use count by the users belonging thereto, or may be displayed in descending order of the cumulative use time by users belonging thereto.

The affiliated organization list generation module 115 is connected to the login screen display control module 110, the user management module 145, and the service processing module 150. The affiliated organization list generation module 115 generates a list of organizations to which the users using the information processing device 100 belong. For example, it is sufficient for multiple organizations that can use the information processing device 100 or multiple organizations that can use the office in which the information processing device 100 is installed to be managed and for a list of those organizations to be generated.

Furthermore, the affiliated organization list generation module 115 may generate a list of organizations in such a way that the organization of the user who transmitted information to the information processing device 100 most recently is displayed at the top.

The policy processing module 120 has an affiliated organization specifying module 125, a policy extraction module 130, and a policy application module 135, and is connected to the login screen display control module 110 and the user management module 145. The policy processing module 120 carries out processing relating to a policy for the information processing device 100. For example, by applying the information protection policy of the organization of a user who is attempting to use a service of the information processing device 100, it can be made possible for that user to use the information processing device 100.

The affiliated organization specifying module 125 specifies the organization to which a user using the information processing device 100 belongs, before identifying that user.

For example, from the list of organizations displayed by the display module 105, the affiliated organization specifying module 125 receives a user operation and specifies an organization selected within that list.

The policy extraction module 130 extracts the information protection policy corresponding to the organization specified by the affiliated organization specifying module 125.

The policy application module 135 applies the information protection policy extracted by the policy extraction module 130, to the information processing device 100.

The user authentication module 140 is connected to the login screen display control module 110 and the user management module 145. In response to a login operation, the user authentication module 140 authenticates the user thereof. If authentication is successful, it becomes possible to use the information processing device 100 to receive the provision of a service, and if authentication is not successful, it is not possible to use the information processing device 100. Examples of authentication include verification of a combination of a user ID and a password, biometric authentication of a fingerprint or the like, authentication carried out by a user possessing an IC card, and the like.

The user management module 145 is connected to the affiliated organization list generation module 115, the policy processing module 120, the user authentication module 140, and the service processing module 150. The user management module 145 manages users and organizations to which the users belong.

The service processing module 150 has a communication module 155, a sender extraction module 160, and a service provision module 165, and is connected to the affiliated organization list generation module 115 and the user management module 145. The service processing module 150 provides a service to a user wo has logged in.

Figure 2:
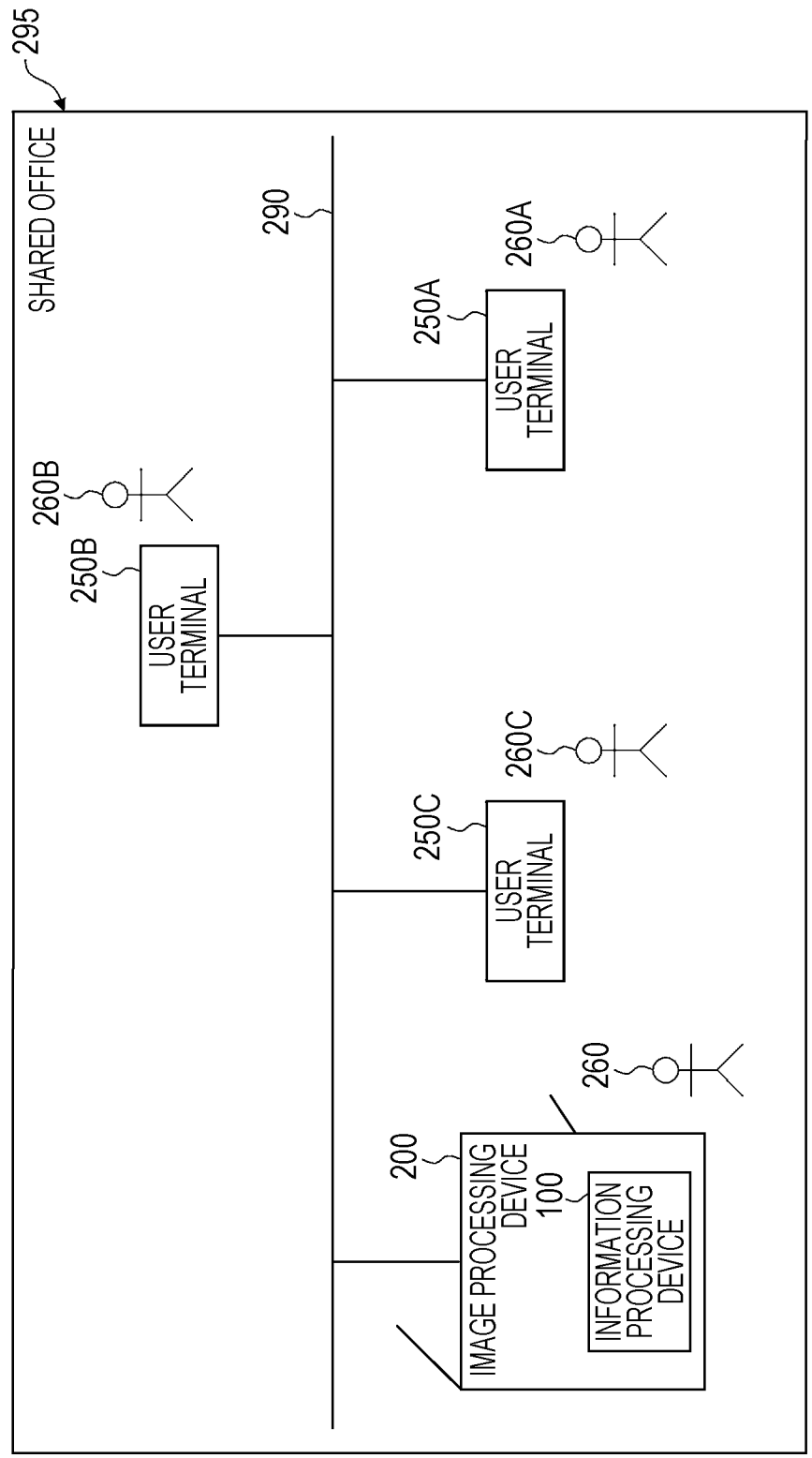
FIG. 2 is an explanatory diagram depicting an example system configuration using the first exemplary embodiment.

The communication module 155 communicates with the terminal used by the user. For example, as depicted in FIG. 2, the communication module 155 communicates with a user terminal 250. The communication module 155 receives information to be processed from the user, and that information may include information identifying the user.

The sender extraction module 160 extracts the information identifying the user from the information received by the communication module 155.

The service provision module 165 provides a service to the user in the case were the user has been identified by the user authentication module 140. Here, in a case were the information processing device 100 is incorporated into the image processing device 200 as depicted in FIG. 2, examples of services include printing, scanning, copying, the transmission and reception of faxes, and the like.

After the user has been identified by the user authentication module 140, the service provision module 165 may process the information to be processed, in a case were that identified user and the user extracted by the sender extraction module 160 match. That is, in a case were a user has been identified, if that user has transmitted information to be processed, the transmitted processing is carried out. For example, in the case of a print job, "the print job is executed without additional instructions". For example, a print instruction or the like corresponds to an "additional instruction" here. Specifically, it can be made possible for a print job of a user to be executed immediately after that user has logged in.

It should be noted that, for example, information such as settings for the information processing device 100 that are transmitted remotely corresponds as "information that is transmitted from a user terminal 250 to the information processing device 100 but does not relate to processing to be carried out after user login". Specific examples may be instruction information for changing the time at which the information processing device 100 enters a power saving rode (for example, instruction information indicating approximately 60 seconds to 2 minutes), may be information that is stored in the case w ere the information processing device 100 also has a function of storing information similar to a file server, or the like.

FIG. 2 is an explanatory diagram depicting an example system configuration using the first exemplary embodiment.

The image processing device 200 includes the information processing device 100. The image processing device 200, a user terminal 250A, a user terminal 250B, and a user terminal 250C are each connected via a communication line 290. The communication line 290 may be wireless, wired, or a combination thereof, and, for example, the Internet, an intranet, or the like may serve as a communication infrastructure.

In a shared office 295, the image processing device 200 is installed, and a user 260 who is a user of the image processing device 200, a user 260A wo possesses the user terminal 250A, a user 260B wo possesses the user terminal 250B, and a user 260C wo possesses the user terminal 250C are present. The users 260 belong to respectively different organizations. It should be noted that an organization here is a unit for which a security policy can be set, examples of which include a company, a department, and the like. A security policy may be set for each organization, and there is a possibility that the content thereof is different for each organization. Consequently, wen the user 260 uses the image processing device 200, it is necessary for that image processing device 200 to be suitable for the security policy to which the user 260 attempting to user the image processing device 200 is subject. However, the security policy does not necessarily have to be different for each organization and may have the sane content.

For example, in a case were the user 260A has transmitted a print job to the image processing device 200 using the user terminal 250A, the user 260A goes to were the image processing device 200 is installed, and is able to cause a document to be printed by logging in to the image processing device 200 and causing that print job to be executed. In this case, it is necessary for the image processing device 200 to be suitable for the security policy of the organization to which the user 260A belongs. Therefore, the information processing device 100 constituting the present exemplary embodiment, prior to the user login, specifies the organization to which the user belongs and applies the security policy corresponding to that organization.

The user management module 145 manages the correspondence between users and organizations to which users belong using a user/organization management table 300. FIG. 3 is an explanatory diagram depicting an example data structure of the user/organization management table 300. The user/organization management table 300 has a user ID column 305, a name column 310, and an organization ID column 315. In the present exemplary embodiment, the user ID column 305 stores information (specifically, user IDs) for uniquely identifying users who are likely to use the information processing device 100. The name column 310 stores the names of those users. The organization ID column 315 constitutes the organizations to which those users belong, and in the present exemplary embodiment, stores information (specifically, organization IDs) for uniquely specifying those affiliations.

The policy extraction module 130 manages the correspondence between organizations and the security policies required by the organizations using an organization/policy management table 400. FIG. 4 is an explanatory diagram depicting an example data structure of the organization/ policy management table 400. The organization/policy management table 400 has an organization ID column 405 and a policy column 410. The organization ID column 405 stores organization IDs. The policy column 410 stores the security policies of those organizations. Examples of security policies determined by the organizations include authentication schemes, communication schemes, and conditions for whether or not monitoring logs are required. If the image processing device 200 does not satisfy such conditions, a user 260 belonging to the organization in question is not able to use the image processing device 200. In particular, for example, as an authentication scheme in a security policy, in a case were whether or not the user ID, password, or the like is to be concealed with characters such as "*" has been specified as "conceal information on the login information input screen", if a user ID is entered first before the organization is specified, the security policy cannot be set to begin with, and therefore the login itself cannot be carried out.

It should be noted that the information processing device 100 may carry out the processing described hereinafter.

The information processing device 100 determines (1) whether there is an organization adopting a security policy in which "conceal information on the login information input screen" is set to "on (concealment required)". In addition, in a case were "yes" is determined in the aforementioned determination (1), it is determined (2) whether a user belonging to the organization adopting that security policy is likely to use the information processing device 100. Then, in a case were "yes" is determined in the aforementioned determination (2), the organization to which the user belongs may be specified before the user is identified. It should be noted that it is sufficient for determination (1) to be carried out using the organization/policy management table 400. Also, it is sufficient for determination (2) to be carried out using the user/organization management table 300.

Figure 5:
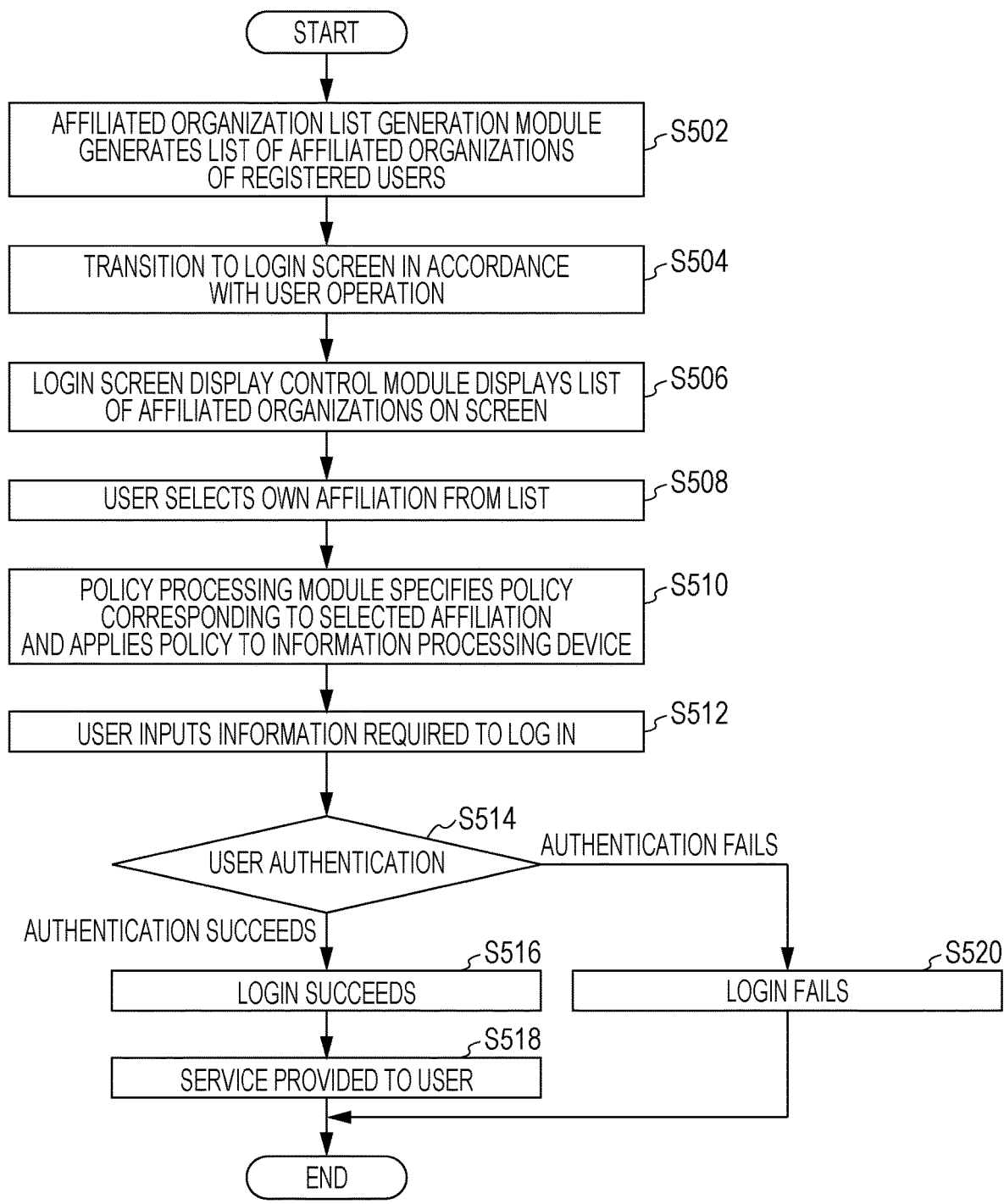
FIG. 5 is a flowchart depicting a processing example according to the first exemplary embodiment.

FIG. 5 is a flowchart depicting a processing example according to the first exemplary embodiment (information processing device 100).

In step S502, the affiliated organization list generation module 115 generates a list of affiliated organizations of registered users.

In step S504, a transition is made to a login screen in accordance with a user operation.

In step S506, the login screen display control module 110 displays a list of affiliated organizations on a screen.

In step S508, the user selects his or her affiliation from the list.

In step S510, the policy processing module 120 specifies a policy corresponding to the selected affiliation and applies the policy to the information processing device 100.

In step S512, the user inputs information required to log in.

In step S514, user authentication is carried out; processing advances to step S516 if authentication is successful, and processing advances to step S520 if authentication fails.

In step S516, it is determined that the login has been successful.

In step S518, a service is provided to the user.

In step S520, it is determined that the login has failed.

Figure 6:
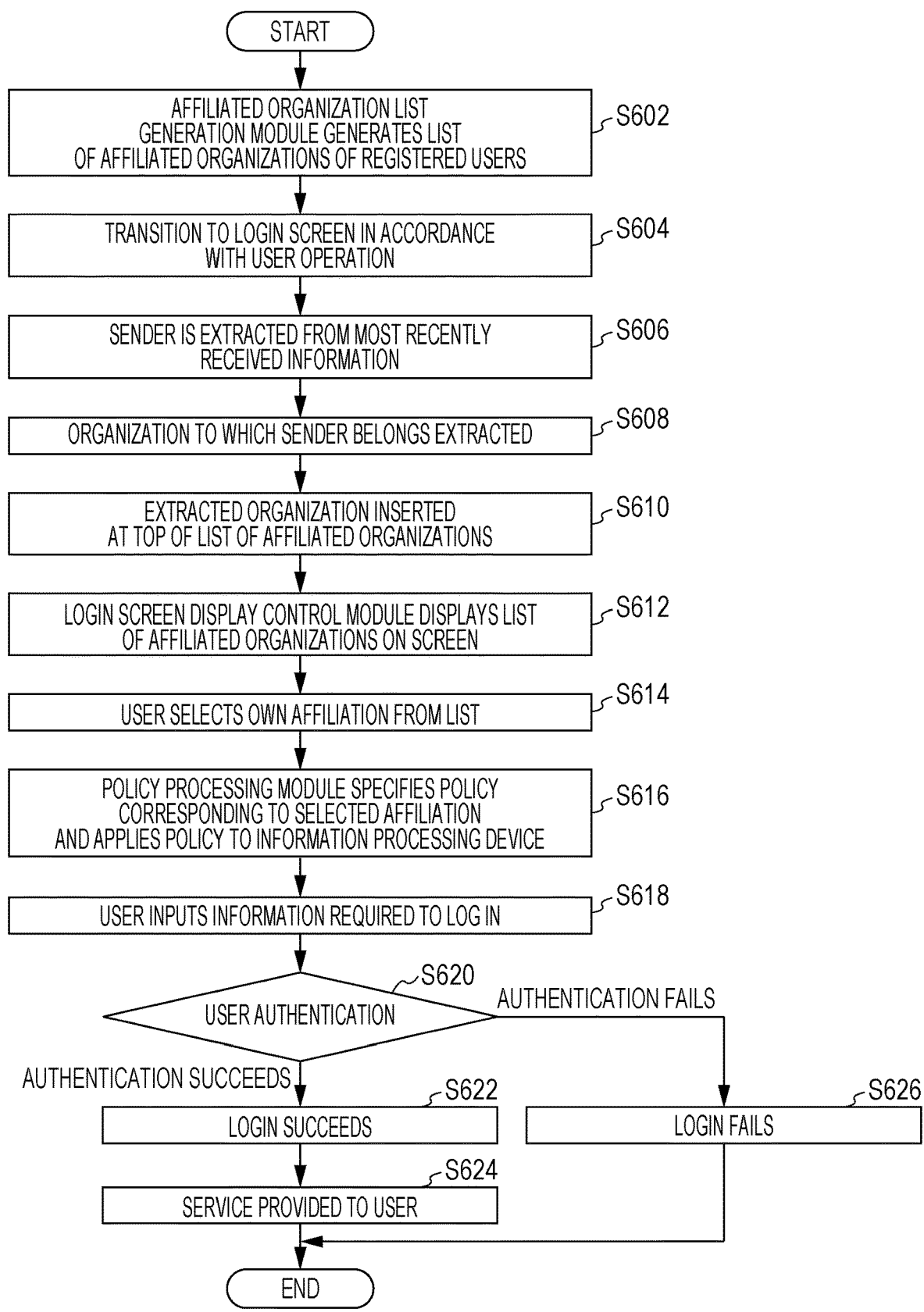
FIG. 6 is a flowchart depicting a processing example according to the first exemplary embodiment.

FIG. 6 is a flowchart depicting a processing example according to the first exemplary embodiment (information processing device 100). The flowchart depicted in the example in FIG. 6 adds the processing of step S606 to step S610 to the flowchart depicted in the example in FIG. 5.

In step S602, the affiliated organization list generation module 115 generates a list of affiliated organizations of registered users.

In step S604, a transition is made to a login screen in accordance with a user operation.

In step S606, a sender is extracted from within the information received most recently. As previously mentioned, for example, the case were a user 260 has transmitted a print job to the image processing device 200 using a user terminal 250 corresponds hereto.

In step S608, the organization to which the sender belongs is extracted.

In step S610, the extracted organization is inserted at the top of the list of affiliated organizations.

In step S612, the login screen display control module 110 displays a list of affiliated organizations on the screen.

In step S614, the user selects his or her affiliation from the list.

In step S616, the policy processing module 120 specifies a policy corresponding to the selected affiliation and applies the policy to the information processing device 100.

In step S618, the user inputs information required to log in.

In step S620, user authentication is carried out; processing advances to step S622 if authentication is successful, and processing advances to step S626 if authentication fails.

In step S622, it is determined that the login has been successful.

In step S624, a service is provided to the user.

In step S626, it is determined that the login has failed.

Second Exemplary Embodiment

Figure 7:
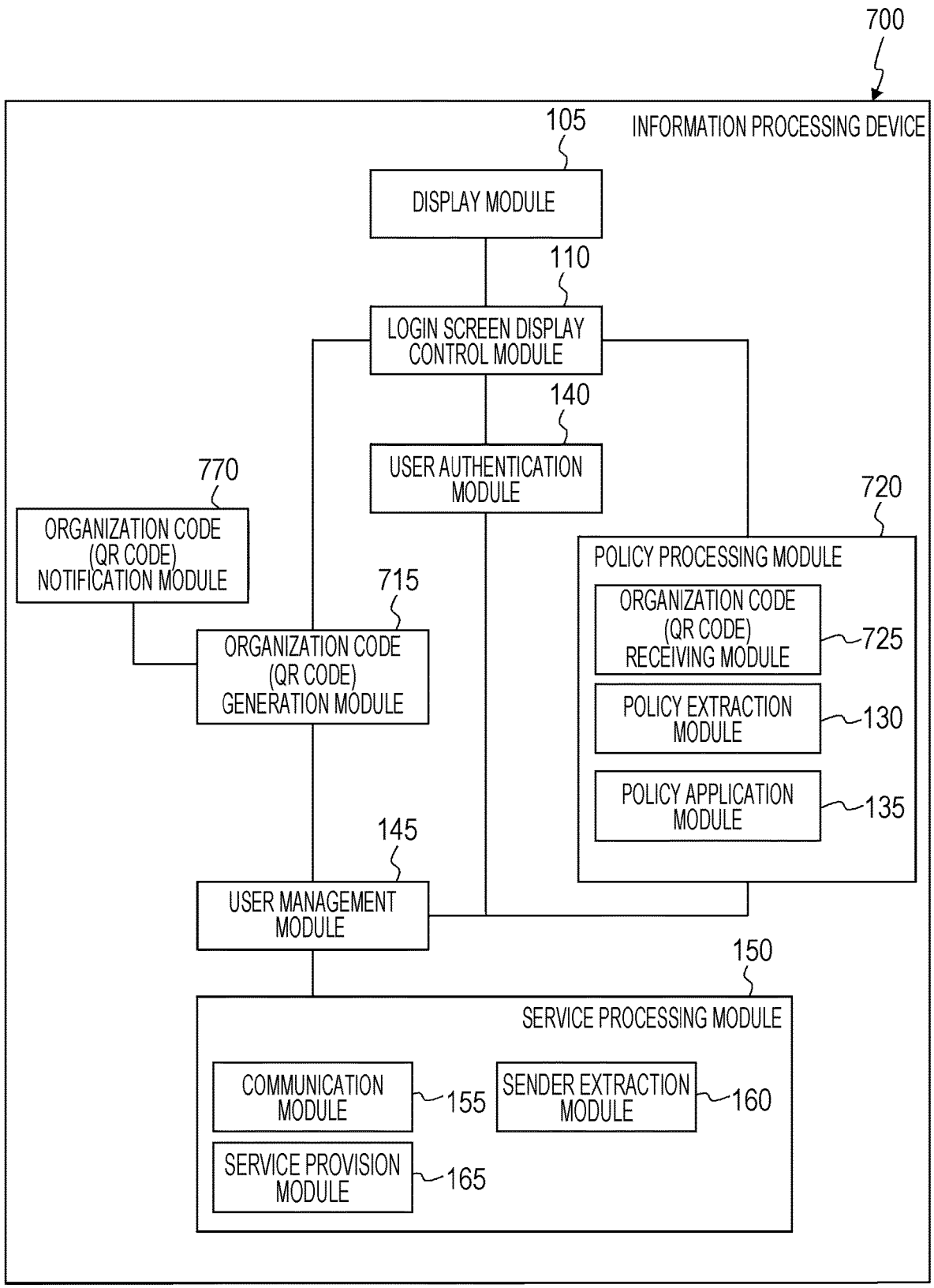
FIG. 7 is a conceptual module configuration diagram for an example configuration of a second exemplary embodiment.

FIG. 7 is a conceptual module configuration diagram for an example configuration of a second exemplary embodiment (information processing device 700).

The information processing device 700 has the display module 105, the login screen display control module 110, an organization code (QR code (registered trademark)) generation module 715, a policy processing module 720, the user authentication module 140, the user management module 145, the service processing module 150, and an organization code (QR code) notification module 770.

It should be noted that parts similar to the first exemplary embodiment are denoted by the sane reference numbers and redundant descriptions are omitted (likewise hereinafter).

The display module 105 is connected to the login screen display control module 110.

The login screen display control module 110 is connected to the display module 105, the organization code (QR code) generation module 715, the policy processing module 720, and the user authentication module 140.

The organization code (QR code) generation module 715 is connected to the login screen display control module 110, the user management module 145, and the organization code (QR code) notification module 770. The organization code (QR code) generation module 715 generates information for specifying an organization sharing the information processing device 700. Examples of "information for specifying an organization" include an information image having an organization code or information for specifying an organization embedded therein, or the like. It should be noted that an information image refers to an image code systematically created to represent electronic data in a machine-readable form and, specifically, examples thereof include a one-dimensional barcode, a two-dimensional code, or the like. In particular, QR codes (quick response codes; registered trademark) have recently been used as two-dimensional codes, and QR codes are also used as an example in the present exemplary embodiment.

In the first exemplary embodiment depicted in the example in FIG. 1, in a case were "organizations sharing the information processing device 100 are displayed in a selectable manner", it is feasible that a user with malicious intent may select an organization to which he or she does not belong. Thus, the information processing device 700 itself generates "information for specifying an organization sharing the information processing device 700", and prompts the user to input that information.

As "input information for specifying an organization", the user may input such information, or an information image indicating the organization to which the user using the information processing device 700 belongs may be read. An example of the former is the case were an organization code, constituted by al phanumeric characters or the like indicating an organization, is input using a keyboard. As an example of the latter, it is sufficient for the organization code (QR code) generation module 715 to generate an information image such as a QR code indicating the organization to which the user using the information processing device 700 belongs, an imaging device such as a camera of the information processing device 700 to read that information image, and "information for specifying an organization" embedded within the information image to be extracted.

The organization code (QR code) notification module 770 is connected to the organization code (QR code) generation module 715. The organization code (QR code) notification module 770 notifies the "information for specifying an organization" generated by the organization code (QR code) generation module 715. An example of a notification is email, chat, an electronic bulletin board, a communication function of an SNS (abbreviation of social networking service), a push notification, a telephone call performed by an automatic voice response, or the like, and it is sufficient for a telephone call to be carried out using Lync (registered trademark), for example. Furthermore, in the case of an information image such as a QR code, that information image may be printed and passed to the users of each organization by the person in charge.

The policy processing module 720 has an organization code (QR code) receiving module 725, the policy extraction module 130, and the policy application module 135, and is connected to the login screen display control module 110 and the user management module 145.

The organization code (QR code) receiving module 725 prompts the user to input information that has been generated by the organization code (QR code) generation module 715, and specifies the organization to which the user belongs from the input information.

Furthermore, in a case were the organization specified by the organization code (QR code) receiving module 725 does not correspond to an organization sharing the information processing device 700, processing to identify the user is not carried out. It should be noted that in the first exemplary embodiment depicted in the example in FIG. 1, a list of organizations is displayed and the user selects therefrom and therefore the case were there is no correspondence to an organization sharing the information processing device 100 does not occur. However, in the second exemplary embodiment depicted in the example in FIG. 7, the user causes an organization code or a QR code to be read, and therefore it is possible for the organization code or QR code to not have been generated by the organization code (QR code) generation module 715; thus, processing such as the aforementioned is carried out. Also, there are persons who are not able to use the information processing device 700 to begin with, and therefore it is not necessary to carry out processing such as user authentication processing to identify the user.

The user authentication module 140 is connected to the login screen display control module 110 and the user management module 145.

The user management module 145 is connected to the organization code (QR code) generation module 715, the policy processing module 720, the user authentication module 140, and the service processing module 150.

The service processing module 150 has the communication module 155, the sender extraction module 160, and the service provision module 165, and is connected to the user management module 145.

Figure 8:
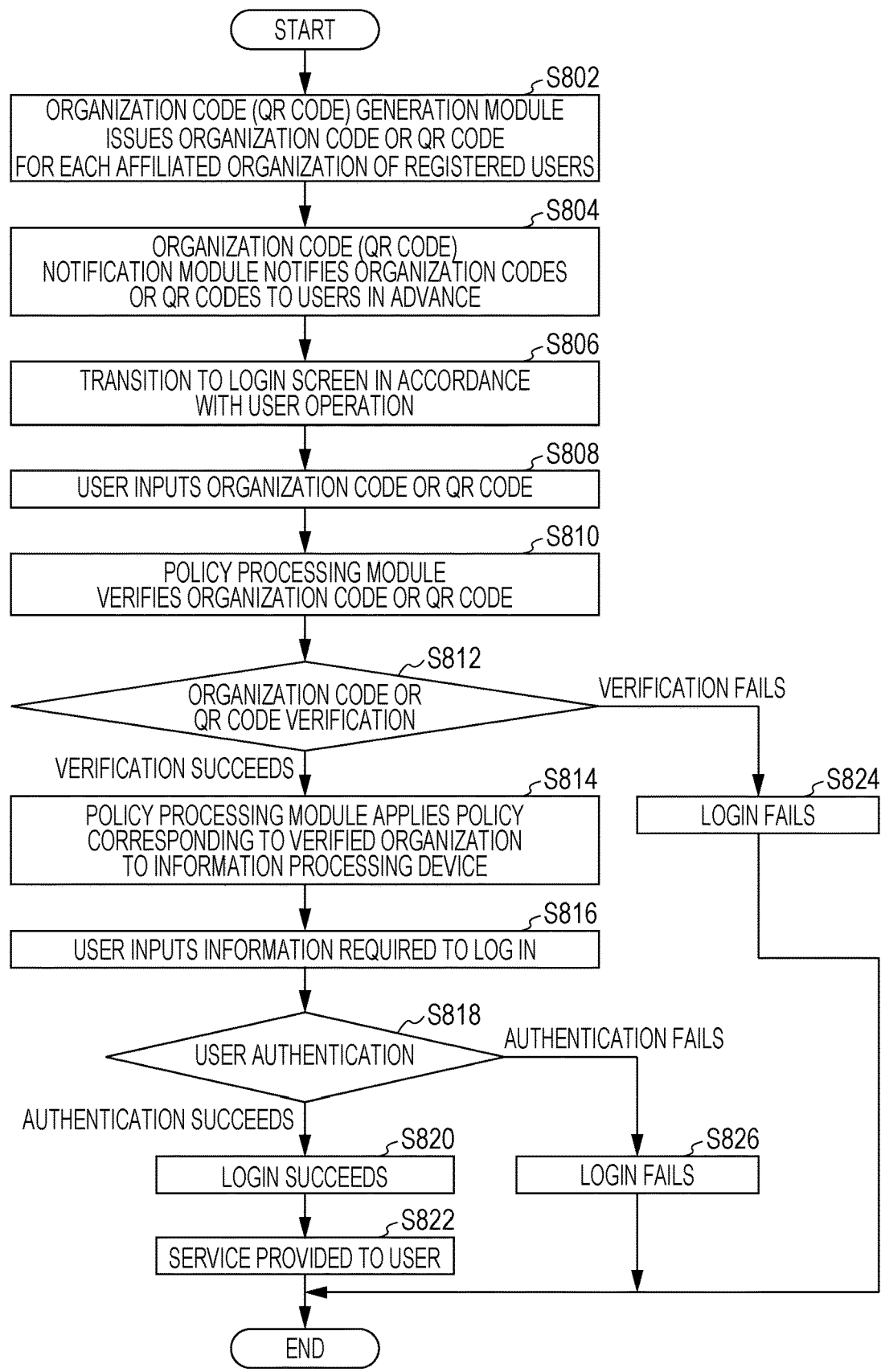
FIG. 8 is a flowchart depicting a processing example according to the second exemplary embodiment.

FIG. 8 is a flowchart depicting a processing example according to the second exemplary embodiment (information processing device 700). It should be noted that the processing of steps S802 and S804 is carried out before the processing of step S806, and, from the second time onward, processing ay be carried out from step S806.

In step S802, the organization code (QR code) generation module 715 issues an organization code or QR code for each affiliated organization of the registered users.

In step S804, the organization code (QR code) notification module 770 notifies the organization codes or QR codes to users in advance.

In step S806, a transition is made to a login screen in accordance with a user operation.

In step S808, the user inputs an organization code or QR code. It is sufficient for an organization code to be input using a virtual keyboard or the like displayed on a display device. Furthermore, for the input of a QR code, it is sufficient for the QR code to be read using a camera or the like provided in the information processing device 700.

In step S810, the policy processing module 720 verifies the organization code or QR code.

In step S812, if the result of the verification in step S810 is successful, processing advances to step S814, and if the verification fails, processing advances to step S824.

In step S814, the policy processing module 720 applies the policy corresponding to the verified organization to the information processing device 700.

In step S816, the user inputs information required to log in.

In step S818, user authentication is carried out; processing advances to step S820 if authentication is successful, and processing advances to step S826 if authentication fails.

In step S820, it is determined that the login has been successful.

In step S822, a service is provided to the user.

In step S824, it is determined that the login has failed.

In step S826, it is determined that the login has failed.

Third Exemplary Embodiment

Figure 9:
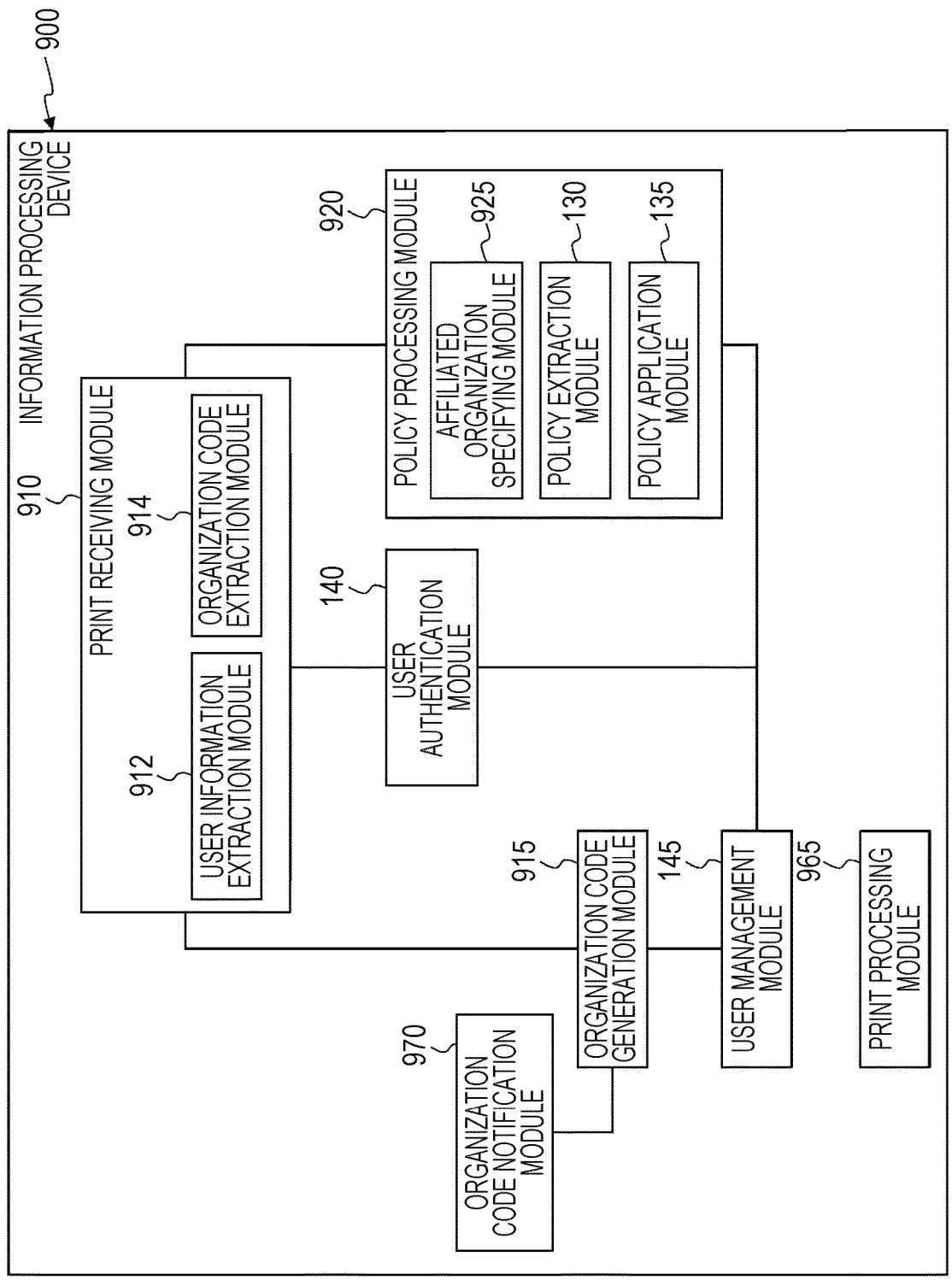
FIG. 9 is a conceptual module configuration diagram for an example configuration of a third exemplary embodiment.

FIG. 9 is a conceptual module configuration diagram for an example configuration of a third exemplary embodiment (information processing device 900).

The information processing device 900 has a print receiving module 910, an organization code generation module 915, a policy processing module 920, the user authentication module 140, the user management module 145, a print processing module 965, and an organization code notification module 970. The information processing device 900, in particular, represents an example housed W thin the image processing device 200, and has the print processing module 965 instead of the service provision module 165 of the information processing device 100.

The print receiving module 910 has a user information extraction module 912 and an organization code extraction module 914, and is connected to the organization code generation module 915, the policy processing module 920, and the user authentication module 140. The print receiving module 910 receives information to be processed by the information processing device 900 from a user. Also, that received information includes therein at least information specifying the organization to which the user belongs. Examples of "information to be processed by the information processing device 900" include a print job and the like.

The user information extraction module 912 extracts user information from the received information.

The organization code extraction module 914 extracts information specifying the organization to which the user belongs from the received information.

The organization code generation module 915 is connected to the print receiving module 910, the user management module 145, and the organization code notification module 970. The organization code generation module 915 generates information for specifying an organization sharing the information processing device 900. Examples of "information for specifying an organization" include an organization code and the like. It should be noted that this information for specifying an organization is included within the information to be processed received by the print receiving module 910. For example, wen the user issues a print instruction, information for specifying an organization may be input and included within the print job.

The policy processing module 920 has an affiliated organization specifying module 925, the policy extraction module 130, and the policy application module 135, and is connected to the print receiving module 910 and the user management module 145.

The affiliated organization specifying module 925 prompts the user to input information that has been generated by the organization code generation module 915, specifies the organization to which the user belongs from the input information, and, in a case were that specified organization and the organization specified using the information specifying an organization extracted by the organization code extraction module 914 match, passes the information specifying an organization to the policy extraction module 130. Then, the policy application module 135 applies the information protection policy corresponding to that organization to the information processing device 900. The print processing module 965 processes the information to be processed.

Furthermore, in a case were multiple organizations are included within the received information, the affiliated organization specifying module 925 may not process the information to be processed or may specify an information protection policy in accordance with a predetermined rule.

Examples of a "predetermined rule" here include applying the information protection policy of the organization first indicated, applying the strongest information protection policy from among the information protection policies of multiple organizations, or the like.

The user authentication module 140 is connected to the print receiving module 910 and the user management module 145.

The user management module 145 is connected to the organization code generation module 915, the policy processing module 920, and the user authentication module 140.

After an information protection policy has been applied, the print processing module 965 carries out processing in accordance with the information to be processed received by the print receiving module 910. For example, in the case were the information to be processed is a print job, print processing is carried out.

The organization code notification module 970 is connected to the organization code generation module 915. The organization code notification module 970 notifies each user of the "information for specifying an organization" generated by the organization code generation module 915.

Figure 10:
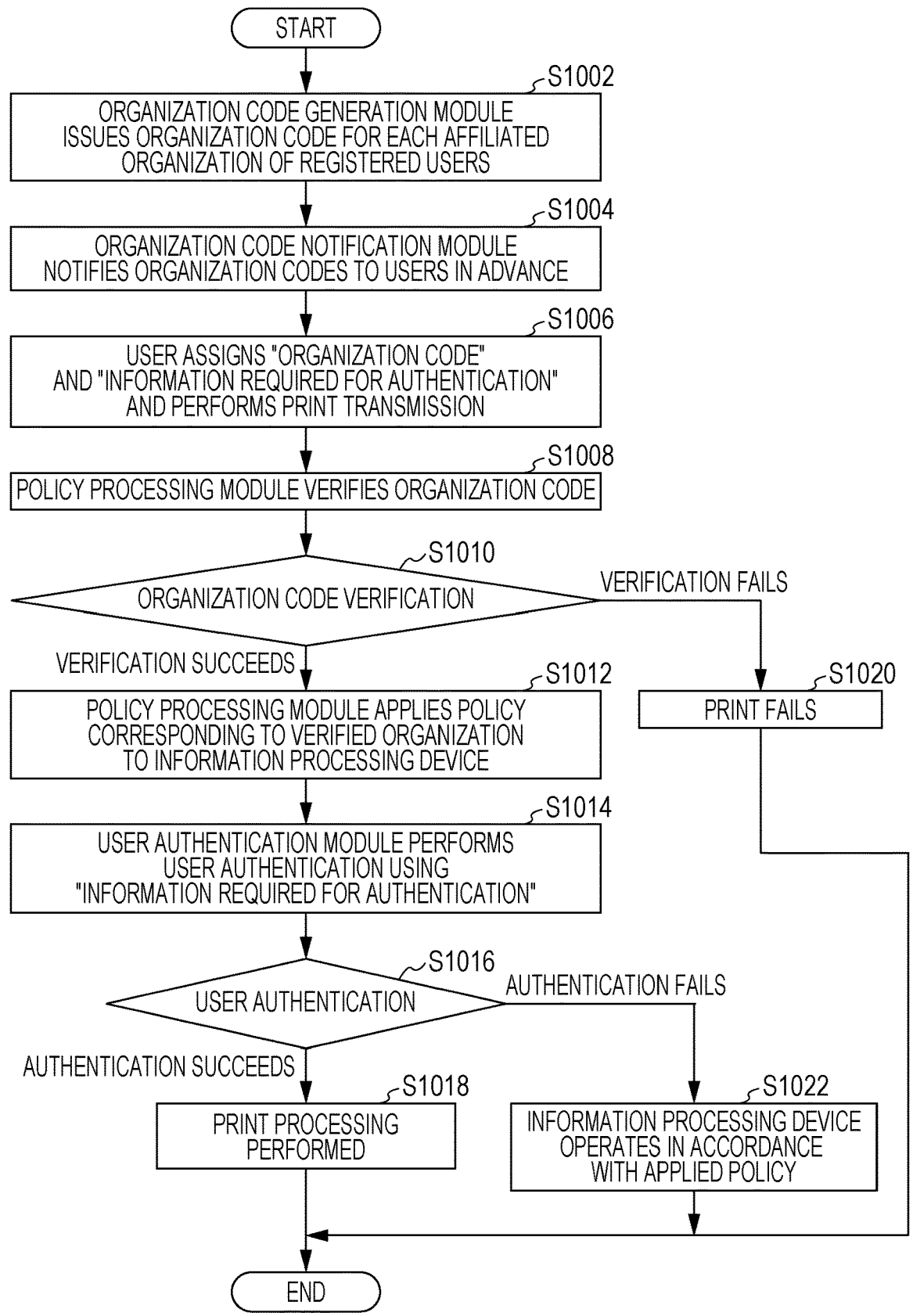
FIG. 10 is a flowchart depicting a processing example according to the third exemplary embodiment.

FIG. 10 is a flowchart depicting a processing example according to the third exemplary embodiment (information processing device 900). It should be noted that the processing of steps S1002 and S1004 is carried out before the processing of step S1006, and, from the second time onward, processing may be carried out from step S1006.

In step S1002, the organization code generation module 915 issues an organization code for each affiliated organization of the registered users.

In step S1004, the organization code notification module 970 notifies the organization codes to users in advance.

In step S1006, the user transmits a print with an "organization code" and "information required for authentication" attached thereto.

In step S1008, the policy processing module 920 verifies the organization code. For the verification here, it is sufficient for the user to be made to input an organization code, and for a determination to be made as to whether or not that input organization code and the organization code within the print job transmitted in step S1006 match.

In step S1010, if the result of the organization code verification in step S1008 is successful, processing advances to step S1012, and if the verification fails, processing advances to step S1020.

In step S1012, the policy processing module 920 applies the policy corresponding to the verified organization to the information processing device 900.

In step S1014, the user authentication module 140 carries out user authentication using the "information required for authentication" within the print job transmitted in step S1006. For example, in a case were the "information required for authentication" is a user ID and a password, it is sufficient for the user to be made to input a user ID and a password, and for a determination to be made as to whether or not these match the user ID and the password within the print job.

In step S1016, if the result of the user authentication in step S1014 is successful, processing advances to step S1018, and if the authentication fails, processing advances to step S1022.

In step S1018, print processing is carried out.

In step S1020, it is determined that the print processing has failed.

In step S1022, the information processing device 900 operates in accordance with the applied policy.

Fourth Exemplary Embodiment

Figure 11:
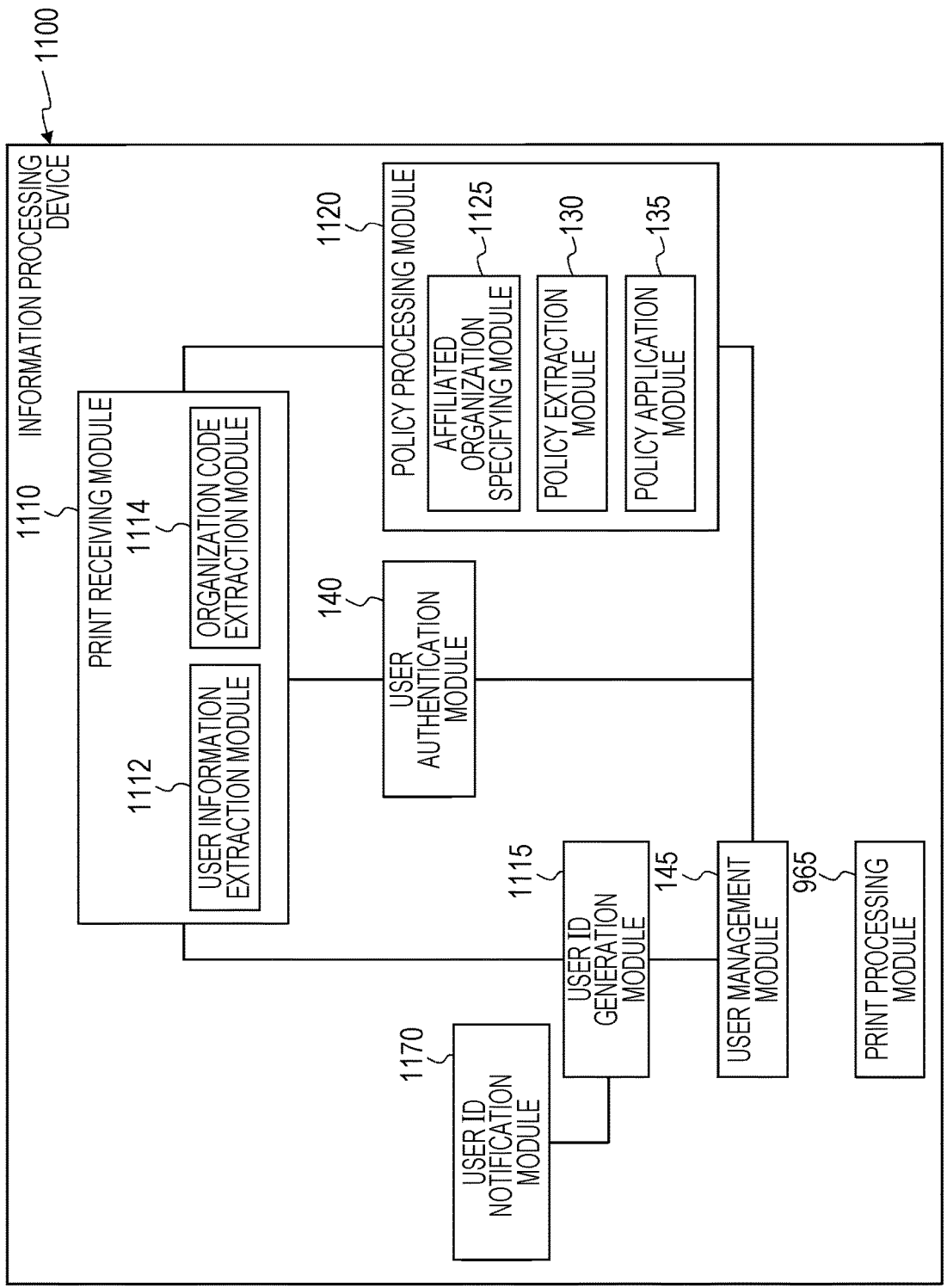
FIG. 11 is a conceptual module configuration diagram for an example configuration of a fourth exemplary embodiment.

FIG. 11 is a conceptual module configuration diagram for an example configuration of a fourth exemplary embodiment (information processing device 1100).

The information processing device 1100 has a print receiving module 1110, a user ID generation module 1115, a policy processing module 1120, the user authentication module 140, the user management module 145, the print processing module 965, and a user ID notification module 1170. The information processing device 1100, in particular, represents an example housed within the image processing device 200, and has the print processing module 965 instead of the service provision module 165 of the information processing device 100.

The print receiving module 1110 has a user information extraction module 1112 and an organization information extraction module 1114, and is connected to the user ID generation module 1115, the policy processing module 1120, and the user authentication module 140. The print receiving module 1110 receives information to be processed by the information processing device 1100 from a user. Also, that received information includes therein at least a user ID generated by the user ID generation module 1115. Examples of "information to be processed by the information processing device 1100" include a print job and the like. It should be noted that a user ID generated by the user ID generation module 1115 includes information specifying an organization as well as a user ID as described later.

The user information extraction module 1112 extracts user information from the user ID within the received information.

The organization information extraction module 1114 extracts information specifying the organization to which the user belongs from the user ID within the received information.

The user ID generation module 1115 is connected to the print receiving module 1110, the user management module 145, and the user ID notification module 1170. The user ID generation module 1115 generates user IDs for users wo are able to use the information processing device 1100. However, those user ID includes therein information for identifying a user and also information specifying the organization to which that user belongs. This may be, for example, information combining a genuine user ID (a genuine user ID here is a user ID that does not include information specifying an organization) and information specifying an organization. Specifically, this may be information in which an organization ID is connected after a genuine user ID. It should be noted that this user ID is included within information to be processed received by the print receiving module 1110. For example, wen the user issues a print instruction, a user ID may be input and included within the print job.

The policy processing module 1120 has an affiliated organization specifying module 1125, the policy extraction module 130, and the policy application module 135, and is connected to the print receiving module 1110 and the user management module 145.

The affiliated organization specifying module 1125 prompts the user to input a user ID that has been generated by the user ID generation module 1115, specifies the organization to which the user belongs from the input user ID, and, in a case were that specified organization and the organization specified using the information specifying an organization extracted by the organization information extraction module 1114 match, passes the information specifying an organization to the policy extraction module 130. Then, the policy application module 135 applies the information protection policy corresponding to that organization to the information processing device 1100. The print processing module 965 processes the information to be processed.

Furthermore, in a case were multiple organizations are included within the received user ID, the affiliated organization specifying module 1125 may not process the information to be processed.

The user authentication module 140 is connected to the print receiving module 1110 and the user management module 145.

The user management module 145 is connected to the user ID generation module 1115, the policy processing module 1120, and the user authentication module 140.

After an information protection policy has been applied, the print processing module 965 carries out processing in accordance with the information to be processed received by the print receiving module 1110. For example, in the case were the information to be processed is a print job, print processing is carried out.

The user ID notification module 1170 is connected to the user ID generation module 1115. The user ID notification module 1170 notifies a user ID generated by the user ID generation module 1115 to that user.

Figure 12:
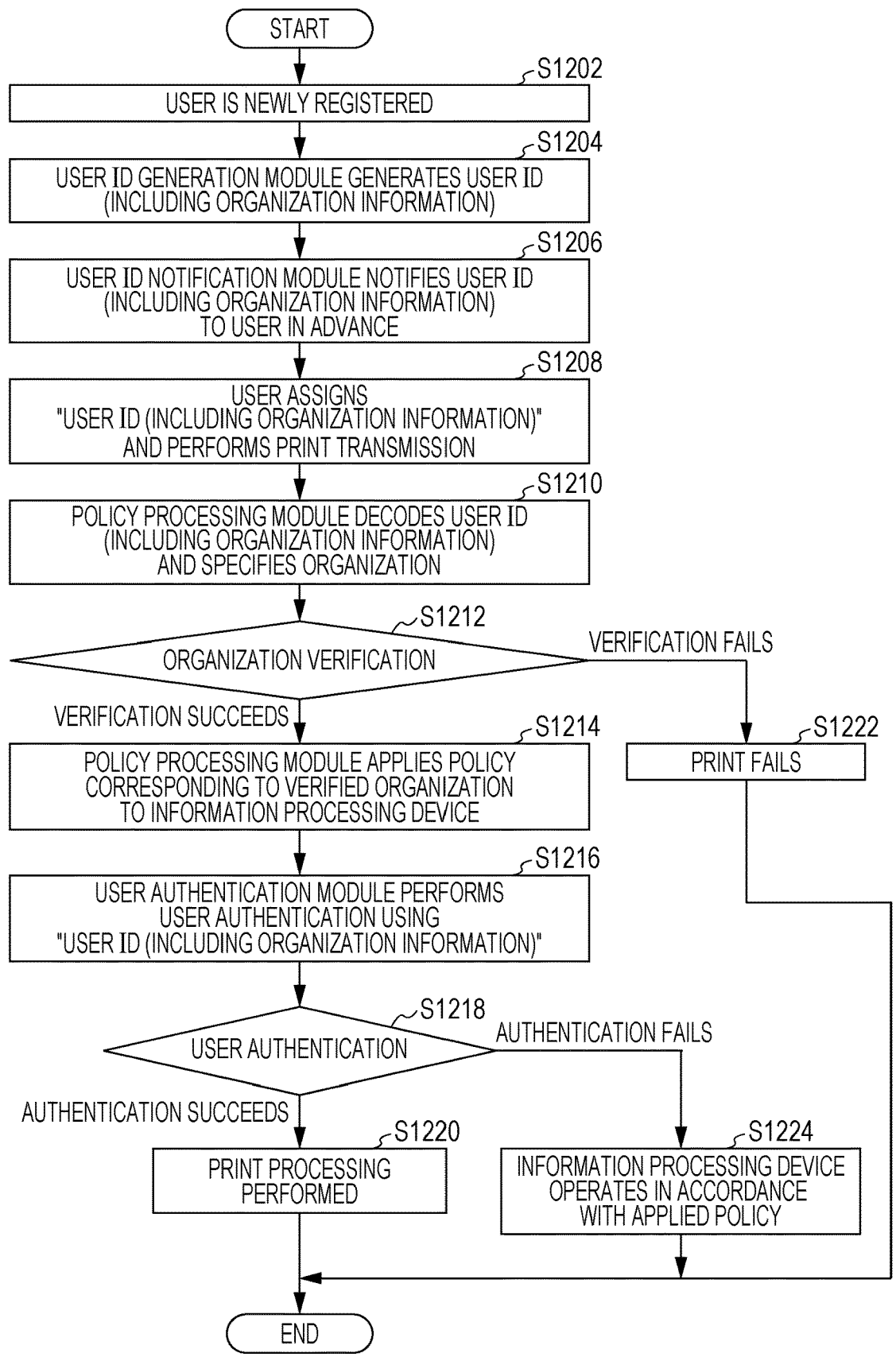
FIG. 12 is a flowchart depicting a processing example according to the fourth exemplary embodiment.

FIG. 12 is a flowchart depicting a processing example according to the fourth exemplary embodiment (information processing device 1100). It should be noted that the processing of steps S1202, S1204, and S1206 is carried out before the processing of step S1208, and, from the second time onward, processing may be carried out from step S1208.

In step S1202, a user is newly registered.

In step S1204, the user ID generation module 1115 generates a user ID (including organization information). As previously mentioned, that user ID includes information identifying the user and information specifying the organization to which that user belongs.

In step S1206, the user ID notification module 1170 notifies the user ID (including organization information) to the user in advance.

In step S1208, the user transmits a print with the "user ID (including organization information)" attached thereto.

In step S1210, the policy processing module 1120 decodes the user ID (including organization information) and specifies an organization code.

In step S1212, an organization verification is carried out; processing advances to step S1214 if the verification is successful, and processing advances to step S1222 if the verification fails. For the verification here, it is sufficient for the user to be made to input an organization code, and for a determination to be made as to whether or not that input organization code and the organization code specified in step S1210 match. Furthermore, using the user/organization management table 300, it may be determined whether or not that specified organization code matches an organization ID corresponding to a genuine user ID.

In step S1214, the policy processing module 1120 applies the policy corresponding to the verified organization to the information processing device 1100.

In step S1216, the user authentication module 140 carries out user authentication using the "user ID (including organization information)". For example, it is sufficient for the user to be made to input a user ID and a password, and for a determination to be made as to whether or not that user ID and password match, and additionally whether or not the user ID within the print job and the user ID input by the user match.

In step S1218, if the result of the user authentication in step S1216 is successful, processing advances to step S1220, and if the authentication fails, processing advances to step S1224.

In step S1220, print processing is carried out.

In step S1222, it is determined that the print processing has failed.

In step S1224, the information processing device 1100 operates in accordance with the applied policy.

Fifth Exemplary Embodiment

Figure 13:
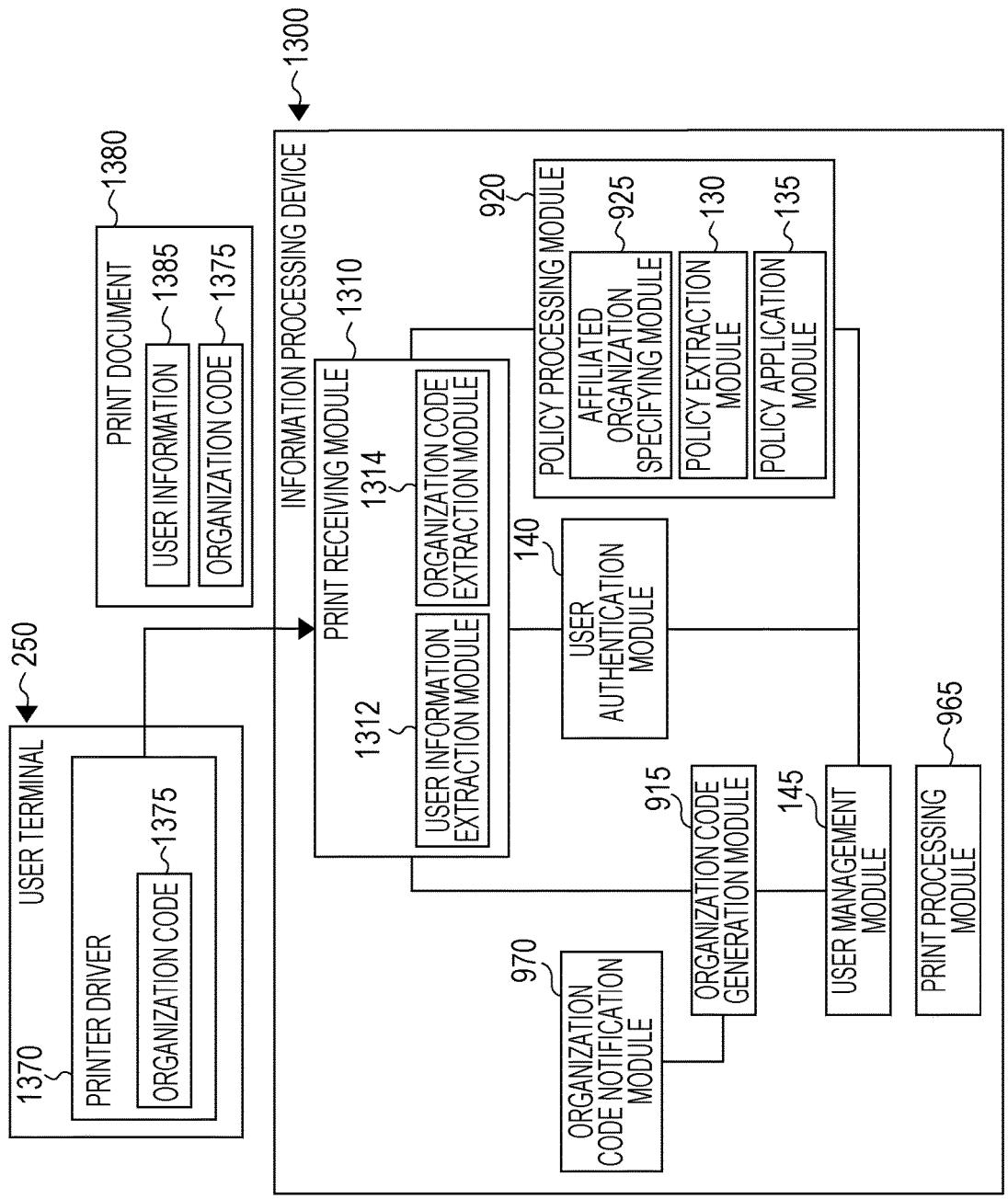
FIG. 13 is a conceptual module configuration diagram for an example configuration of a fifth exemplary embodiment.

FIG. 13 is a conceptual module configuration diagram for an example configuration of a fifth exemplary embodiment (information processing device 1300).

The information processing device 1300 has a print receiving module 1310, the organization code generation module 915, the policy processing module 920, the user authentication module 140, the user management module 145, the print processing module 965, and the organization code notification module 970. The information processing device 1300, in particular, represents an example housed within the image processing device 200, and has the print processing module 965 instead of the service provision module 165 of the information processing device 100.

The print receiving module 1310 has a user information extraction module 1312 and an organization code extraction module 1314, and is connected to the organization code generation module 915, the policy processing module 920, the user authentication module 140, and a printer driver 1370 of the user terminal 250. The print receiving module 1310 receives a print document 1380, which is information to be processed by the information processing device 1300, from the user terminal 250 of a user. Also, user information 1385 and an organization code 1375 are included within that print document 1380. Examples of "information to be processed by the information processing device 1300" include a print job and the like.

The user information extraction module 1312 extracts the user information 1385 from the received print document 1380.

The organization code extraction module 1314 extracts the organization code 1375 from the received print document 1380.

The organization code generation module 915 is connected to the print receiving module 1310, the user management module 145, and the organization code notification module 970.

The policy processing module 920 has the affiliated organization specifying module 925, the policy extraction module 130, and the policy application module 135, and is connected to the print receiving module 1310 and the user management module 145.

The user authentication module 140 is connected to the print receiving module 1310 and the user management module 145.

The user management module 145 is connected to the organization code generation module 915, the policy processing module 920, and the user authentication module 140.

The organization code notification module 970 is connected to the organization code generation module 915. It should be noted that the organization code notification module 970 here notifies an organization code to a person who manages the user terminals 250 in each organization. The person who has received that organization code then generates the printer driver 1370 with the organization code 1375 embedded therein. Next, that printer driver 1370 is installed in the user terminals 250 used by the users 260 belonging to that organization within the shared office 295. As a result, due to the printer driver 1370 being used in each user terminal 250, the print document 1380 is generated including the organization code 1375 and the user information 1385.

The user terminals 250 have the printer driver 1370.

The printer driver 1370 has the organization code 1375 incorporated therein, and the print receiving module 1310 of the information processing device 1300 connected thereto. The printer driver 1370 generates the print document 1380 in accordance with a print operation of the user 260. At such time, the user ID which is the user information 1385, and the organization code 1375 which is incorporated in advance in the printer driver 1370, are included in the print document 1380. The print document 1380 is then transmitted to the print receiving module 1310.

FIG. 14 is a flowchart depicting a processing example according to the fifth exemplary embodiment (information processing device 1300). It should be noted that the processing of steps S1402, S1404, S1406, and S1408 is carried out before the processing of step S1410, and, from the second time onward, processing may be carried out from step S1410.

In step S1402, the organization code generation module 915 issues an organization code for each affiliated organization of the registered users.

In step S1404, the organization code notification module 970 notifies the organization codes to an administrator in each organization.

In step S1406, an administrator sets the "organization code 1375" in the printer driver 1370.

In step S1408, the administrator distributes the printer driver 1370 to end users. The end users install the printer driver 1370 in their user terminals 250.

In step S1410, a user instructs a print transmission with the "authentication information" (user information 1385) attached thereto.

In step S1412, the printer driver 1370 performs a print transmission with the "organization code 1375" attached to the print document 1380.

In step S1414, the policy processing module 920 verifies the organization code 1375. For the verification here, it is sufficient for the user to be made to input an organization code, and for a determination to be made as to whether or not that input organization code and the organization code 1375 within the print document 1380 transmitted in step S1412 match. Furthermore, using the user/organization management table 300, it may be determined whether or not that organization code 1375 matches an organization ID corresponding to the user information 1385.

In step S1416, if the result of the organization verification in step S1414 is successful, processing advances to step S1418, and if the verification fails, processing advances to step S1426.

In step S1418, the policy processing module 920 applies the policy corresponding to the verified organization to the information processing device 1300.

In step S1420, the user authentication module 140 carries out user authentication using the "authentication information". For example, it is sufficient for the user to be made to input a user ID and a password, and for a determination to be made as to whether or not that user ID and password match, and additionally whether or not the user ID within the user information 1385 within the print document 1380 and the user ID input by the user match.

In step S1422, if the result of the user authentication in step S1420 is successful, processing advances to step S1424, and if the authentication fails, processing advances to step S1428.

In step S1424, print processing is carried out.

In step S1426, it is determined that the print processing has failed.

In step S1428, the information processing device 1300 operates in accordance with the applied policy.

An example hardware configuration of the information processing device 100, the image processing device 200, the user terminal 250, the information processing device 700, the information processing device 900, the information processing device 1100, and the information processing device 1300 of the present exemplary embodiments will be described with reference to FIG. 15. The configuration depicted in FIG. 15 is constituted by a personal computer or the like, and indicates an example hardware configuration provided with a data reading unit 1517 such as a scanner and a data output unit 1518 such as a printer.

A CPU (abbreviation of central processing unit) 1501 is a controller that executes processing according to a computer program that describes an execution sequence for the various modules described in the aforementioned exemplary embodiments, in other words, modules such as the display module 105, the login screen display control module 110, the affiliated organization list generation module 115, the policy processing module 120, the affiliated organization specifying module 125, the policy extraction module 130, the policy application module 135, the user authentication module 140, the user management module 145, the service processing module 150, the communication module 155, the sender extraction module 160, the service provision module 165, the organization code (QR code) generation module 715, the policy processing module 720, the organization code (QR code) receiving module 725, the organization code (QR code) notification module 770, the print receiving module 910, the user information extraction module 912, the organization code extraction module 914, the organization code generation module 915, the policy processing module 920, the organization code notification module 970, the print receiving module 1110, the user information extraction module 1112, the organization information extraction module 1114, the user ID generation module 1115, the policy processing module 1120, the user ID notification module 1170, the print receiving module 1310, the user information extraction module 1312, the organization code extraction module 1314, and the printer driver 1370.

A ROM (abbreviation of read-only memory) 1502 stores program, operation parameters, and the like used by the CPU 1501. A RAM (abbreviation of random access memory) 1503 stores programs used in the execution by the CPU 1501, parameters that change as appropriate in that execution, and the like. These are connected to each other by a host bus 1504 configured of a CPU bus or the like.

The host bus 1504 is connected via a bridge 1505 to an external bus 1506 such as a PCI (abbreviation of peripheral component interconnect/interface) bus.

A keyboard 1508 and a pointing device 1509 such as a mouse are devices that are operated by an operator. A display 1510 is a liquid crystal display device, an organic EL display, a CRT (abbreviation of cathode ray tube) display, or the like, and displays various types of information as text and image information. Furthermore, a touch screen or the like provided with both the functions of the pointing device 1509 and the display 1510 may be used. In that case, the function of a keyboard may be realized, without having to implement a physical connection similar to the keyboard 1508, by a keyboard (a so-called software keyboard, also referred to as a screen keyboard or the like) being drawn by software on a screen (for example, a touch screen).

An HDD (abbreviation of hard disk drive) 1511 houses therein a hard disk (may be a flash memory or the like other than a hard disk), drives the hard disk, and records or runs program and information executed by the CPU 1501. The HDD 1511 stores the user/organization management table 300, the organization/policy management table 400, data such as print documents 1380 received from user terminals 250, and result data or the like from processing carried out by the affiliated organization list generation module 115 and the like. In addition, other various types of data, various types of computer programs, and the like are stored.

A drive 1512 reads data or a program recorded on a removable recording medium 1513 such as a mounted magnetic disk, optical disc, magneto-optical disc, or semiconductor memory, and supplies that data or program to the RAM 1503 connected via an interface 1507, the external bus 1506, the bridge 1505, and the host bus 1504. It should be noted that the removable recording medium 1513 can also be used as a data recording region.

A connection port 1514 connects an external connection device 1515, and has a connection unit such as a USB or IEEE1394 interface. The connection port 1514 is connected to the CPU 1501 and the like via the interface 1507, the external bus 1506, the bridge 1505, the host bus 1504, and the like. A communication unit 1516 is connected to a communication line and executes data communication processing with the outside. The data reading unit 1517 is a scanner, for example, and executes document reading processing. The data output unit 1518 is a printer, for example, and executes document data output processing.

Of the aforementioned exemplary embodiments, those implemented using a program are realized by causing a system having the present hardware configuration to read a computer program which is software and having the software and the hardware resources cooperate with each other.

It should be noted that the hardware configuration of the information processing device 100 and the like depicted in FIG. 15 illustrates one example configuration, and the present exemplary embodiments are not restricted to the configuration depicted in FIG. 15 and it is sufficient for the hardware configuration to be a configuration that is capable of executing the modules described in the present exemplary embodiments. For example, as a processor, a graphics processing unit (GPU) may be used, including general-purpose computing on graphics processing units (GPGPU), some modules may be configured using dedicated hardware (examples are an application-specific integrated circuit (ASIC), a reconfigurable integrated circuit (a specific example is a field-programmable gate array (FPGA), or the like), some modules may be part of an external system and connected by communication lines, and there may be more than one of the system depicted in FIG. 15 connected to each other by communication lines and operating in cooperation with each other. Furthermore, in particular, other than a personal computer, the processor may be incorporated into a mobile information communication device (including a mobile phone, a smartphone, a mobile device, a wearable computer, or the like), an information hone appliance, a robot, a copier, a fax machine, a scanner, a printer, a multifunction device (an image processing device having any two or more functions such as that of a scanner, a printer, a copier, and a fax machine), or the like.

It should be noted that the program described may be provided stored in a recording medium or may be provided using a communication unit. In this case, for example, the described program may be treated as a "computer-readable recording medium having a program recorded thereon".

A "computer-readable recording medium having a program recorded thereon" refers to a computer-readable recording medium on which a program is recorded, which is used to install and execute a program distribute a program and so forth.

It should be noted that examples of a recording medium include a digital versatile disc (DVD) such as "DVD-R, DVD-RW DVD-RAM or the like" which are standards formulated by the DVD Forum and "DVD+R, DVD+RW or the like" which are standards formulated according to DVD+RW a compact disc (CD) such as read-only memory (CD-ROM), CD recordable (CD-R), and CD rewritable (CD-RW), a Blu-ray (registered trademark) disc, a magneto-optical disc (MD), a flexible disk (FD), magnetic tape, a hard disk, read-only memory (ROM), electrically erasable and rewritable read-only memory (EEPROM (registered trademark)), flash memory, random access memory (RAM, an SD (abbreviation of secure digital) memory card, and the like.

Also, some or all of the program may be recorded on the recording medium and saved, distributed, and so forth. In addition, some or all of the program may be transmitted using telecommunication, for example, may be transmitted using a transmission medium such as a wired network or wireless communication network used in a local area network (LAN, a metropolitan area network (MAN), a wide area network (WAN), the Internet, an intranet, an extranet, or the like, or additionally a combination thereof, or may be transferred on a carrier wave.

In addition, the program ay constitute some or all of another program or may be recorded on a recording medium together with a separate program Furthermore, the program may be recorded divided across multiple recording mediums. Furthermore, the program ay be recorded in any state provided that the program can be compressed and encrypted or the like and restored.

The foregoing description of the exemplary embodiments of the present disclosure has been provided for the purposes of illustration and description. It is not intended to be exhaustive or to limit the disclosure to the precise form; disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device shared by a plurality of organizations having different information protection policies, the information processing device comprising:
  a processor programmed to:
    specify an organization to which a user who is attempting to use the information processing device belongs, before identifying the user;
    apply an information protection policy corresponding to the specified organization, to the information processing device, the information protection policy including at least a security policy in an authentication scheme indicating whether or not information on a log-in screen is to be concealed;
    after the information protection policy is applied, receive user information identifying the user for a log-in process on the log-in screen in accordance with the information protection policy; and
    after successful authentication of the received user information, allow the user to use the information processing device.

2. The information processing device according to claim 1, wherein the processor is programmed to:

in specifying the organization of the user who is attempting to use the information processing device, display organizations sharing the information processing device in such a way that an organization can be selected, and display an organization of a user who transmitted information to the information processing device most recently in a higher position than other organizations.

3. The information processing device according to claim 2, wherein the processor is programmed to:
receive information to be processed by the information processing device from the user; and
after having identified the user based on the user information identifying the user for a log-in process, in a case where the identified user and the user within the received information to be processed match, process the information to be processed.

4. The information processing device according to claim 1, wherein the processor is programmed to:
generate information for specifying the organizations sharing the information processing device; and
prompt the user to input the information that has been generated, and specify the organization to which the user belongs from the information that has been input.

5. The information processing device according to claim 1, wherein processing to identify the user for the log-in process is not carried out in a case where the organization specified does not correspond to the organizations sharing the information processing device.

6. The information processing device according to claim 4, wherein
the information that has been generated is a QR code.

7. The information processing device according to claim 4, wherein the processor is programmed to:
receive information to be processed by the information processing device from the user, the information including information specifying the organization to which the user belongs; and
perform control so as to prompt the user to input information that has been generated, specify the organization to which the user belongs from the information that has been input, and, in a case where the specified organization and the organization within the received information to be processed match, process the information to be processed.

8. The information processing device according to claim 7, wherein, in a case where a plurality of organizations are included within the received information to be processed, the processor does not process the information to be processed, or specifies an information protection policy in accordance with a predetermined rule.

9. A non-transitory computer readable medium storing a program causing a computer within an information processing device to execute a process, the information processing device being shared by a plurality of organizations having different information protection policies, and the process comprising:
specifying an organization to which a user who is attempting to use the information processing device belongs, before identifying the user;
applying an information protection policy corresponding to the specified organization, to the information processing device, the information protection policy including at least a security policy in an authentication scheme indicating whether or not information on a log-in screen is to be concealed;
after the information protection policy is applied, receiving user information identifying the user for a log-in process in accordance with the information protection policy; and
after successful authentication of the received user information, allowing the user to use the information processing device.

10. An information processing method to be performed by an information processing device shared by a plurality of organizations having different information protection policies, the information processing method comprising:
specifying an organization to which a user who is attempting to use the information processing device belongs, before identifying the user;
applying an information protection policy corresponding to the specified organization, to the information processing device, the information protection policy including at least a security policy in an authentication scheme indicating whether or not information on a log-in screen is to be concealed;
after the information protection policy is applied, receiving user information identifying the user for a log-in process in accordance with the information protection policy; and
after successful authentication of the received user information, allowing the user to use the information processing device.

* * * * *